March 12, 1963  W. BENNETT ET AL  3,081,292
VEHICLE RUNNING GEAR AND SUSPENSION
Filed Oct. 31, 1960  6 Sheets-Sheet 1

WALTER BENNETT,
STEPHEN BARKER,
INVENTORS.

BY Barkelow & Lewis

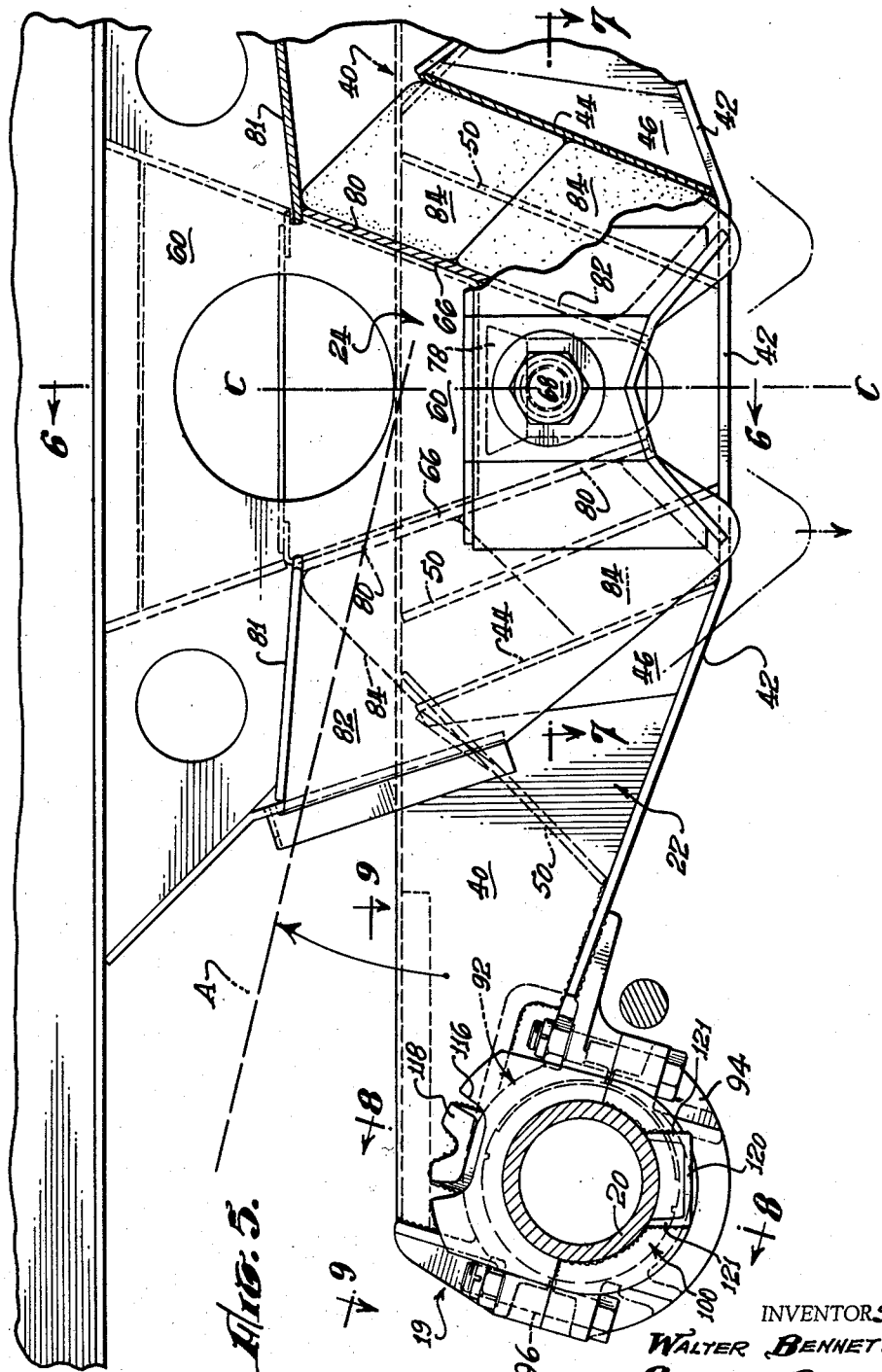

March 12, 1963 W. BENNETT ET AL 3,081,292
VEHICLE RUNNING GEAR AND SUSPENSION
Filed Oct. 31, 1960 6 Sheets-Sheet 3
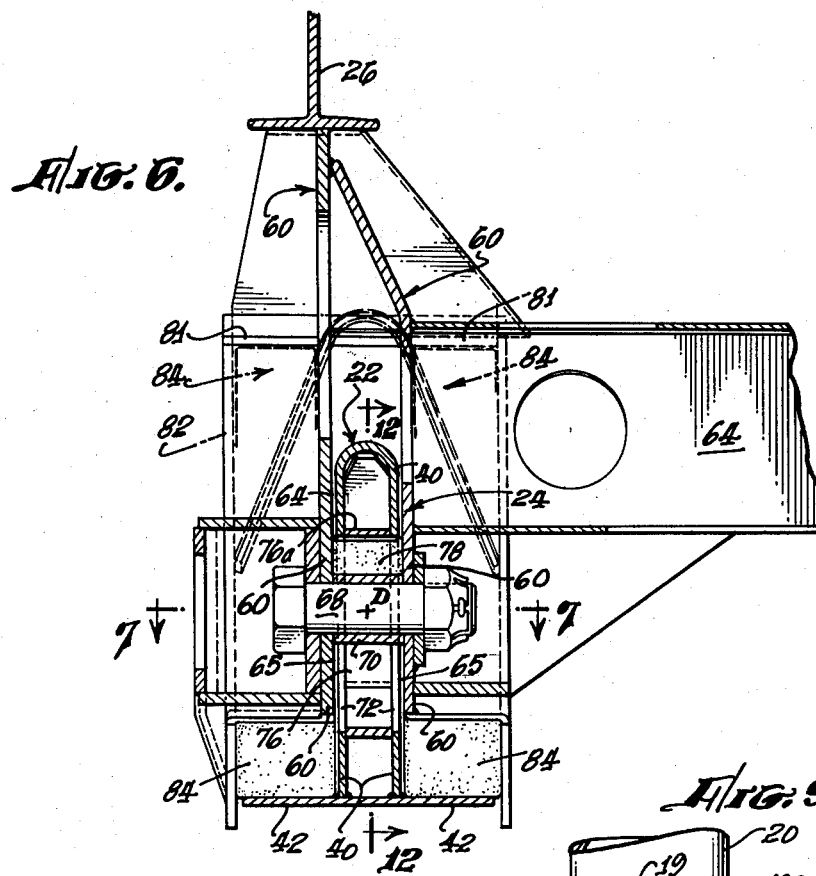
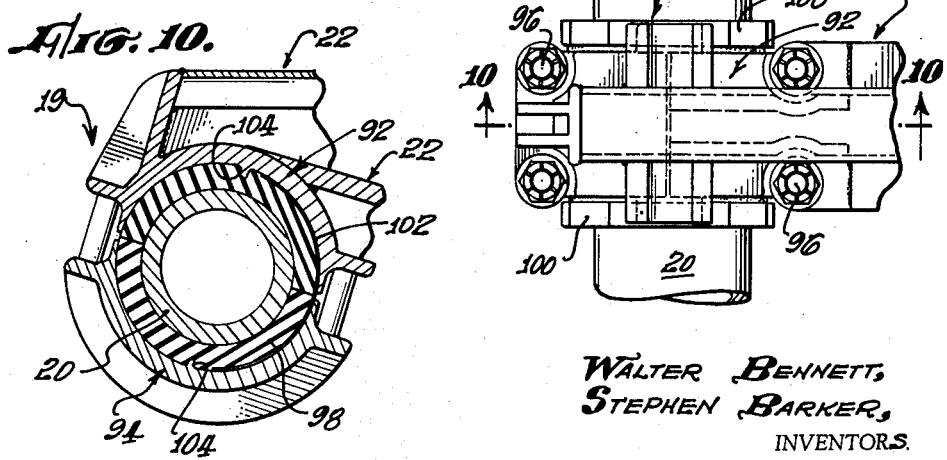
WALTER BENNETT,
STEPHEN BARKER,
INVENTORS.
BY

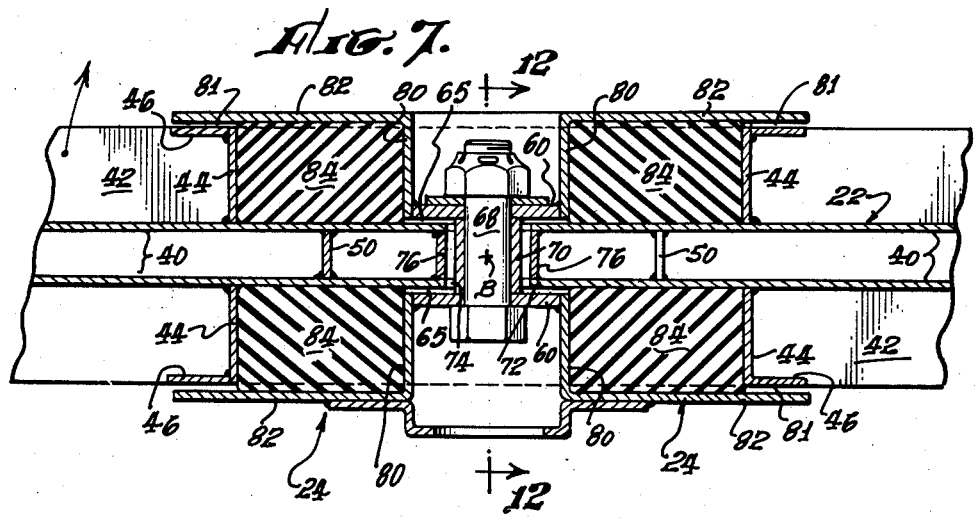
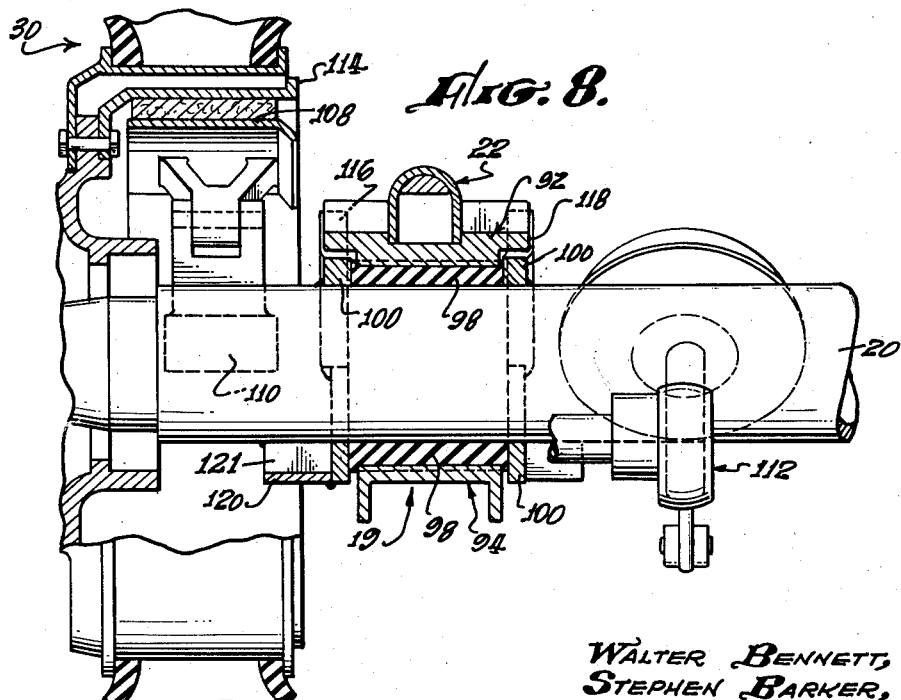

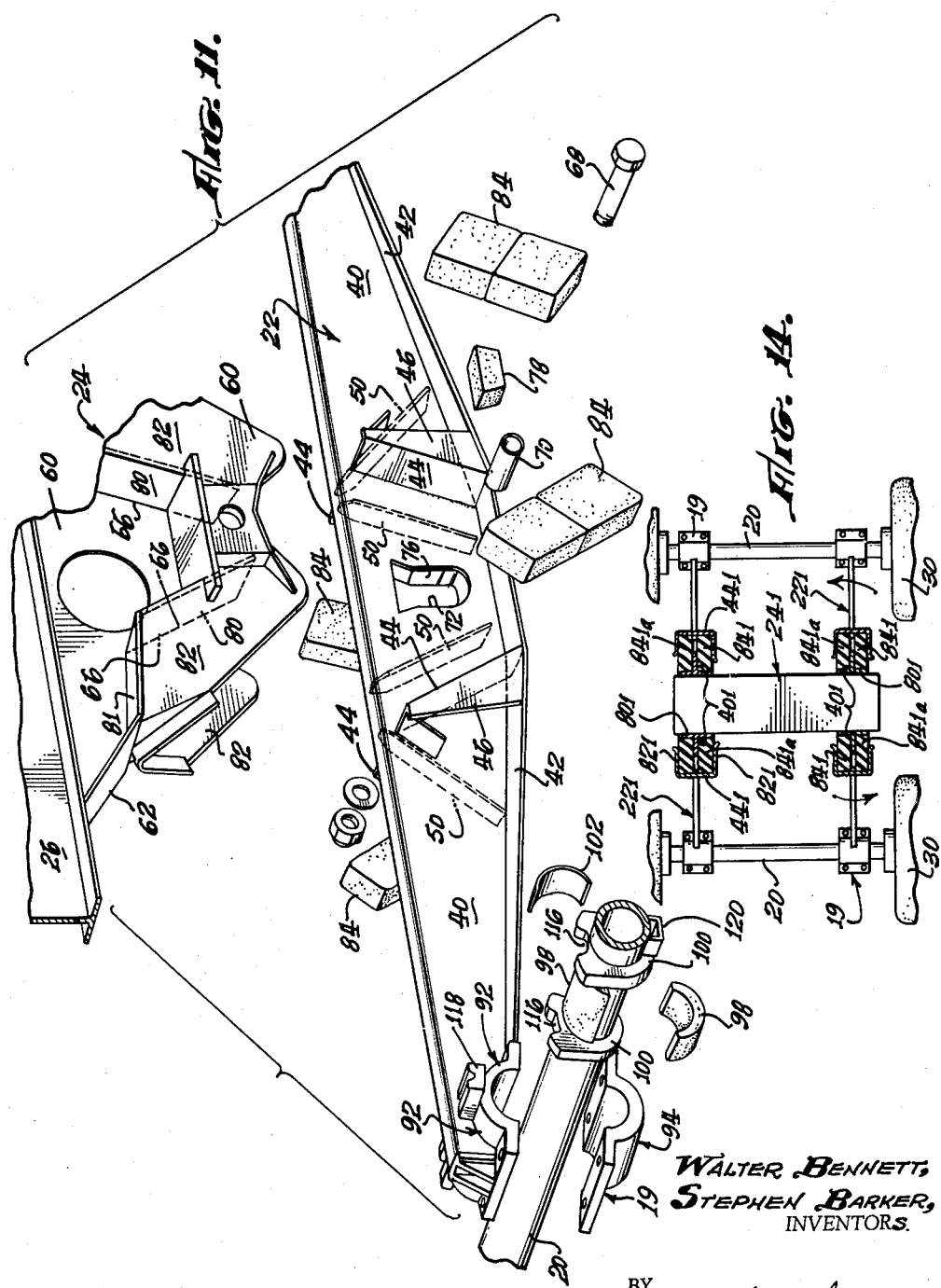

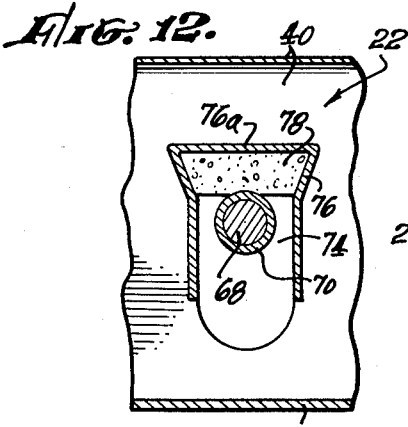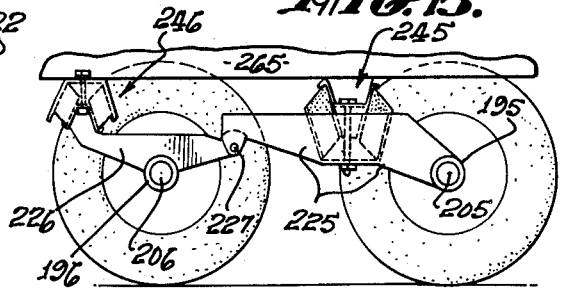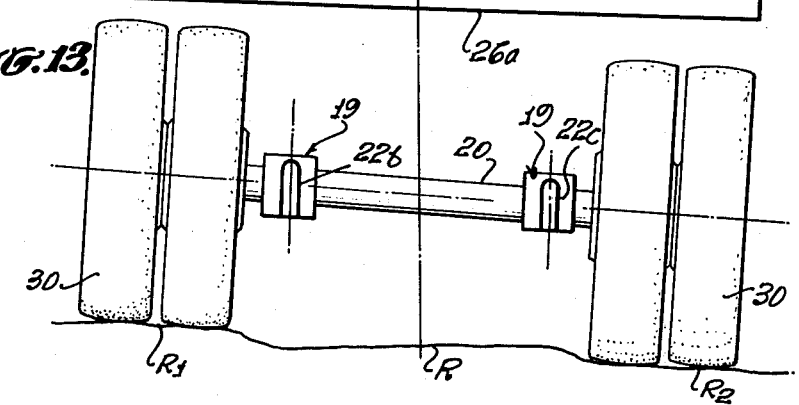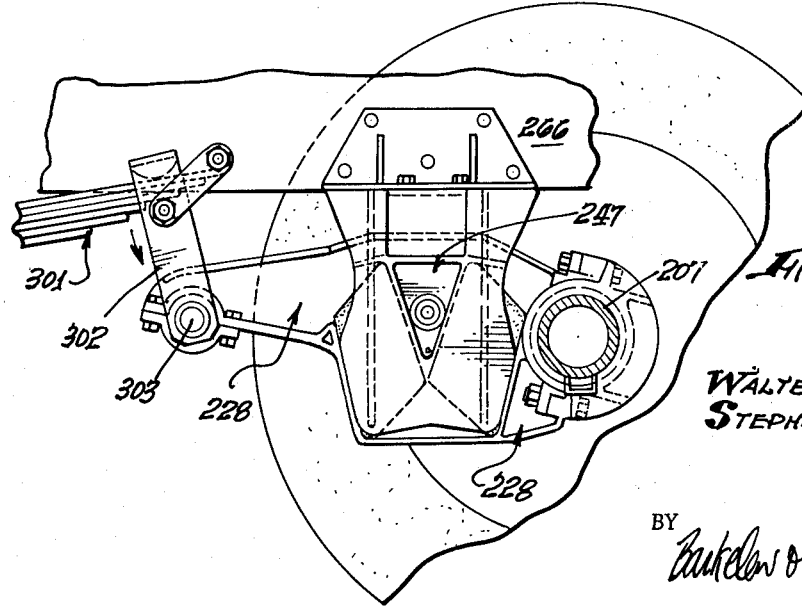
WALTER BENNETT,
STEPHEN BARKER,
INVENTORS.
BY Barkdan & Lewis

United States Patent Office 3,081,292
Patented Mar. 12, 1963

3,081,292
VEHICLE RUNNING GEAR AND SUSPENSION
Walter Bennett, Los Angeles, and Stephen Barker, Temple City, Calif., assignors to Utility Trailer Manufacturing Company, Industry, Calif., a corporation of California
Filed Oct. 31, 1960, Ser. No. 66,166
7 Claims. (Cl. 280—104.5)

This invention has to do with improvements in the type of running gear and suspension adapted, for example but not limitedly, to the non-driven running gear support of e.g., a trailer. The general objects of the invention will be best gathered from the following descriptions of its general characteristics and accomplishments, and of the specific features of the presently preferred form.

In general, the invention involves, among other things, a suspensory running gear comprising two longitudinally extending and laterally spaced beams each hung under the vehicle frame for limited, and resiliently opposed, universal swinging movement, with one or more transverse wheel supported axles articulated to or carried by the beams in flexible relation thereto so as to allow of independent universal beam swing.

In the specific preferred form here described in detail, the beams are centrally hung and carry a transverse, wheel supported, axle across each pair of their laterally opposed ends. However, in another form, one pair of beam ends may have spring forces applied to them to balance the wheel applied forces on the single axle at the other end pair.

Another aspect of the invention resides in a novel suspension system for the two axle-carrying beams, regarding the latter merely as axle carrying members. The characteristic feature of the suspension system involves two laterally spaced V-formations of seats which cooperate, through confined rubber-like blocks, with two V-formations of seats arranged at opposite sides of the axle-carrying member.

The invention will be best understood from the following detailed descriptions of specific illustrative embodiments, with reference to the accompanying drawings, wherein:

FIG. 5 is a further enlarged fragmentary sectional elevation in the aspect of line 5—5 on FIG. 4;

FIG. 6 is a vertical section on line 6—6 of FIG. 5;

FIG. 7 is a horizontal section on line 7—7 of FIG. 5;

FIG. 8 is a section on line 8—8 of FIG. 5 and also showing the mounting of the brake mechanism;

FIG. 9 is a fragmentary plan in the aspect of line 9—9 on FIG. 5;

FIG. 10 is a longitudinal section on line 10—10 of FIG. 9;

FIG. 11 is an exploded perspective showing parts of the suspension;

FIG. 12 is a detail section on lines 12—12 of FIGS. 6 and 7;

FIG. 13 is a schematic illustrating certain actions of the devices;

FIG. 14 is a schematic plan section similar to that of FIG. 4, showin a modification; and FIGS. 15 and 16 are schematic elevations showing other modifications.

Figure 1:
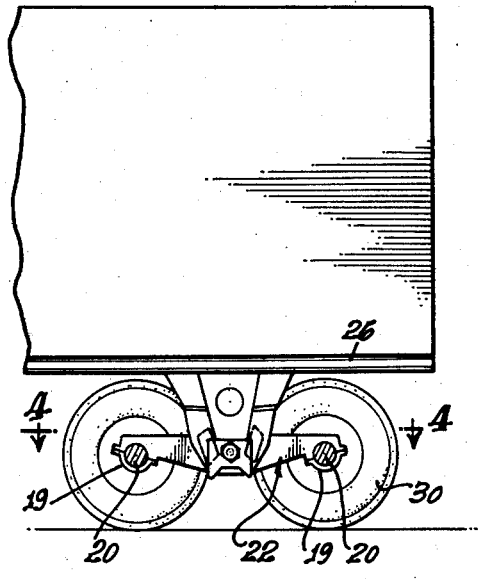
FIG. 1 is a schematic side elevation showing the preferred embodiment as the rear suspensory running gear of a trailer.
Figure 2:
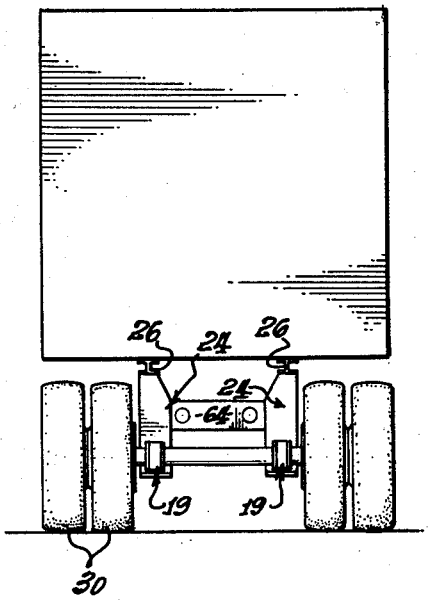
FIG. 2 is a rear elevation.
Figure 3:
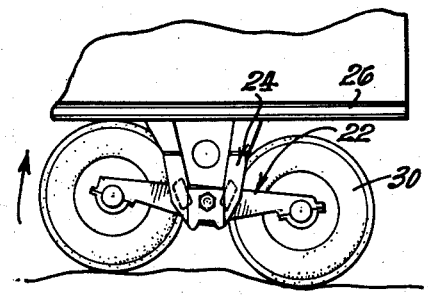
FIG. 3 is a schematic side elevation showing tilting of the suspension in a vertical plane.

FIGURES 5 to 10 inclusive are all approximately to the same scale illustrating a suspensory running gear of about eighteen tons capacity. The dimensions of the design and its various parts may be approximately scaled by taking axle 20 to be five inches in diameter.

The drawings, FIGS. 1 to 4, show two longitudinally extending and normally horizontal beam elements 22, mounted at their respective centers in suspension members 24 which are dependently mounted in lateral spacing under laterally spaced vehicle frame beams 26. Two axles 20 extend laterally across the pairs of ends of the two beams 22, mounted in and carried by mountings 19 on those beam ends. Running gear wheels 30 are carried by the axles outside the beams. Since the two beam structures, their suspension members and their axle carriages are identical at opposite sides of the vehicle, detailed descriptions of the features of one, as shown in FIGS. 5 to 12, apply to both.

As shown in those detail figures beam 22 is formed, in section, of a narrow central inverted U-section 40 with a lower flange plate 42 welded to its lower edges. The beam has greater vertical depth at its center than at its ends. Spaced equally and oppositely from its center (see FIG. 5 where the center of the beam and of the suspension member 24 is indicated by the line C—C) the beam carries, projecting outwardly at opposite sides of the central U-section, pairs of sloping seat members 44 seated on flange plate 42 at their lower edges, reinforced by flanges 46 at their outer edges, and welded to the beam. As shown in FIGS. 5 and 11 these seat members diverge upwardly and outwardly at angles of approximately 20° to the vertical central line. Incidentally, the plates shown in broken lines at 50 in FIGS. 5 and 11 are reinforcing and stiffening members secured across the inside of the beam U-section to hold the sides of that section against the distortion that the beams are subjected to. The pairs of seat members 44 at each side of the beam form a pair of V-seat-formations.

Suspension member 24 (see FIGS. 5, 6, 7 and 11) in its structure comprises two vertical plates 60 laterally spaced in longitudinal planes. These plates, welded or otherwise affixed to the corresponding frame beam 26, and braced and reinforced by gussets such as 62 and a cross beam 64 (FIGS. 2 and 6), constitute the main supporting members of suspension member 24. They reach down at opposite sides over the U-section 40 of the central part of beam 22, with lateral clearances at 65 (FIGS. 6 and 7). The lower ends of these plates are narrowed, as is indicated in the horizontal section showing of FIG. 7 and as indicated by their lower edge lines indicated 66 in FIG. 5, and 11. On the approximate central transverse axis of the swing of the beam in a vertical plane (the plane of FIG. 5) a transverse tie bolt 68, surrounded by a spacer 70 which maintains the spacing of the two plates 60, ties the two plates together in fixed spaced relation, see particularly FIGS. 6, 7 and 12. The bolt and spacer pass through vertically extending slots 72 in the two sides of the beam U-section 40, with clearance, fore-and-aft, in the beam section, such as indicated at 74 in FIGS. 7 and 12. As shown in those figures and FIG. 11, a spacer member 76 extends between and welded to the two sides of the U-section 40 around the slots 72, with clearance fore-and-aft around spacer 70. And a rubber-like block 78 lies under the upper part 76a of spacer 76 and over the spacer 70 to limit and absorb any rebound upward movement of the suspension 24 relative to the beam. The tapered fit of 78 prevents its dropping out of place.

Each suspension member plate 60 (FIGS. 5, 6, 7 and 11) carries pairs of sloping seats 80 projecting outwardly from the plate, and each with a flange 82 at its outer edge in a longitudinal vertical plane. Each pair of seats 80 forms a pair of V-seat formations lying spacedly inside the corresponding pair of V-formations formed by the beam seats 44 (FIG. 7), with the pairs 44 and 80 normally in parallel relation (FIG. 5). Outer flanges 82 overhang the outer flanged edges of beam seats 44, with clearances at 81. Four rubber-like blocks 84 (here shown each as made up of two parts) lie between the four seat pairs 44, 80 and are confined laterally between the side surfaces of beam section 40 and the outer flanges 82, as best shown in FIG. 7. The side surfaces of the beams form, in effect, confining flanges at the inner edges of the seats 44.

Under vertical load suspension member 24 with its seats 80 moves down relative to the beam, compressing each of the four rubber blocks between the seats and distorting them in shear. The beam slot at 72 fully allows that depression under load; while the block at 78 limits relative downward movement of the beam. The blocks 84 are not cemented or otherwise attached to the seats 44 and 80, being restrained against vertical bodily movement on the seats by ledges 81 on suspension member 24 at the upper ends of seats 80, and by the flange plate 42 at the lower ends of seats 44 on the beam. The blocks 84 are otherwise allowed to creep on the seats, as has been set out in the application of Heinmiller and Karsh, Ser. No. 724,967, filed March 31, 1958.

In the present preferred design, two dead axles 20 (FIG. 4) extend across and are mounted in the pairs of laterally opposite beam ends, in mountings designated generally by the numeral 19. All four mountings are identic; details of one being shown in FIGS. 5, 8, 9 and 10 and in exploded perspective in FIG. 11.

An upper, semi-cylindric mounting member 92 is fixed, as by welding, to the end of the beam. A complementary lower member 94 is secured, as by bolts 96, to form a cylindric mounting casing in which a rubber-like sleeve 98 is radially compressed about the axle 20 with sufficient pressure that the sleeve, by circumferential resilient shear, resists axle rotation in the mounting. Two ring flanges 100, welded to the axle, bear against the rubber sleeve ends and overlie the ends of members 92 and 94. Their endwise bearings on the rubber sleeve cause that sleeve to resiliently resist relative endwise axle movement; while their spaced overhang at the ends of 92, 94 limits such endwise movement and allows tilting of the axle in transverse vertical and horizontal planes relative to the beams, as will be referred to later. In general, the rubber sleeves allow universal angular swinging or tilting of the axle, including axle rotation on its axis, relative to the beams.

FIG. 8 indicates brake shoes 108 mounted at 110 on the axles, and shoe operating means 112 also carried by the axle. The shoes transmit braking torque from brake drum 114 of wheel 30 to the axle. To limit axle rotation by that applied torque the two ring flanges 100, welded to the axle, are peripherally recessed at 116 (FIG. 5) to take lugs 118 projecting from casing member 92, with clearance. The clearance allows the limited axle rotation relative to the beams, or one of them, necessary for certain relative beam and axle movements discussed below.

It is essential, for roadability of the running gear, that in normal position both axles 20 be accurately normal to the longitudinal axis of the vehicle. To compensate for, e.g., slight inaccuracies in the mounting of the suspension members 24 at opposite sides of the vehicle, a semi-cylindric shim 102 (FIG. 10) may be inserted in the casing 92, 94 either forward of or behind rubber sleeve 98, circumferential displacement of the shim being prevented by inwardly projecting lugs 104 on 92 and 94.

Incidentally, outer ring flange 100 (the one to the left in FIG. 8) is not directly welded to axle 20 all round. A short piece of channel 120 (see also FIG. 5) has its spaced flanges 121 welded to the axle, in position against that flange 100 and against the under side of the axle. The flange is then welded to the abutting end of the channel rather than directly to the under side of the axle. This arrangement, eliminating welding at the bottom of the axle adjacent the axle flange, insures nonfracture of the axle at that point of its under-side that is subjected to severe strains in tension.

Relative movements of the beams in or on their suspension mountings are now discussed. First, it will be apparent that, under increasing load or downward thrust, the suspension elements 24 will move down on the beams, compressing and shear-distorting the rubber blocks 84 to take the increased thrust.

Assuming that FIG. 5 shows the parts approximately in their positions where the vehicle frame and suspensions 24 are in uppermost positions on the beams, it is apparent, without detailed description that beam 22 may tilt in a longitudinal vertical plane—the plane of that figure—about the central horizontal axis of 68. If, for instance, the beam tilts up at the left hand end the upper parts of blocks 84 at the right and the lower parts of 84, at the left will be compressed to oppose the tilt and to restore the beam to normal horizontal position. It will be noted, from FIGS. 5 and 11, that the upper suspension member structure 24 is open above the beam between plates 60 up to the ledges 81 between the flanges 82. The beam consequently can tilt up to such an angle as shown at A in FIG. 5. In use of an actual construction the maximum angle is about 10° above the horizontal. The rubber blocks usually absorb all such angular movement without the beam reaching a limiting metal-to-metal contact.

The beam also may swing in a longitudinal horizontal plane about a central vertical axis, such as that indicated at B on FIG. 7. The clearances at 64, 74 and 81 allow horizontal swinging in an actual construction up to about one degree to each side of the normal position of FIG. 7. On swinging, for instance, in the direction indicated by the arrow, the blocks, as shown in FIG. 7, at upper left and lower right, are laterally compressed to resist and restore the swing. The specified clearances are large enough that in the actual practical structure the rubber blocks limit the horizontal swing and do not allow metal-to-metal contact.

Furthermore, the beam may swing in a transverse vertical plane about a central longitudinal axis, such as that indicated at D on FIG. 6. That is allowed by the clearances at 64 and by the vertical beam-slots 72; in an actual construction, to about 0.5° to each side of the normal vertical beam position shown in FIG. 6. On beam swinging clockwise, for instance, in that figure, the lower parts of rubber blocks 84 to the left in that figure are compressed, as are also the upper parts of the blocks 84 to the right in that figure; resisting and restoring the swing.

Figure 4:
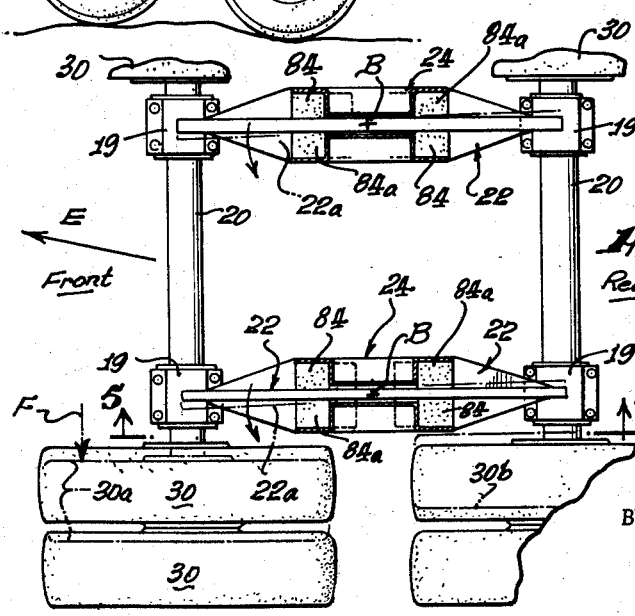
FIG. 4 is an enlarged section on line 4—4 of FIG. 1.

It is to be particularly noted that, with the depending suspension members straddling the beams, with the rubber block seats on both sides of the beams, the swinging centers D of FIG. 6, and B of FIGS. 4 and 7, are centrally located with respect to the beams, which are symmetric with respect to the horizontal and vertical axes of those centers. And, at the same time, the illustrated structure enables the horizontal transverse axis for beam swing in a vertical longitudinal plane to be located low down on the beams, substantially at the bolt 68. The rubber blocks and seats, particularly seats 44 on the beams, extending both above and below 68, place the axis of that beam swing substantially at 68. And, further, that axis, in that location, is substantially in the normal horizontal plane of the centers of the wheel axles 20. Thus, with the swinging axis at 64 in that normally horizontal plane, and with the other two swinging axes B and D centrally located in symmetric relation to the beams, all three swinging movements of the beams cause a minimum of other movements of the beam ends and the axles. For instance, swing of a beam end and axle in the plane of FIG. 5 up and down from its normal position, is attended with much less fore and aft axle displacement than it would be if axle 20 were normally located at a position above or below the horizontal plane of the swinging axis at 68.

Because of interconnection by one or both axles 20 at pairs of beam ends, the two beams are constrained to swing together in their horizontal swings about their vertical central axes B. Refer to FIG. 4 and assume the suspension running gear there schematically shown is at the rear end of a vehicle being guided at its front end around a curve in the direction indicated by the arrow E. The front wheels 30 (to the left in FIG. 4) then tend to pull outwardly of the curve in the direction of arrow F to such a relative position as indicated by the broken line 30a. At the same time rear wheels 30 (to the right in FIG. 4) tend to pull inwardly of the curve to such a position as indicated by the broken line 30b. Beams 22 are thus thrown to such swung positions as indicated at 22a, with the forward wheels 30 outward and the rear wheels inward with reference to the curve. That wheel shift makes them track more closely to the curve instead of tracking, as is usually the case, inward of the curve around which the vehicle front end is being guided.

It has been explained how rubber blocks 84 resiliently allow and resist the described horizontal swinging movement. The rubber sleeves 98 in the axle mountings 19 also allow and resiliently resist that swinging movement by resilient resistance to the angular change, indicated in FIG. 4, between axles 20 and beams 22. In an actual structure these combined resilient resistances limit the angular horizontal displacement of the beams to about 1.25° to each side of the normal longitudinal positions.

Finally, there remains to be explained the action of this suspensory running gear when the wheel at one axle end drops with relation to the vehicle body or frame to a level below that of the wheel at the other axle end. FIG. 13 is a schematic illustrating the action. Assume left hand wheel 30 has risen on a hump R1, while right hand wheel 30 has dropped into a depression R2. Axle 20 is thus thrown to such a non-horizontal angle as shown. Left hand mounting 19, together with its associated beam end 22b is relatively raised, that at the right together with its beam end 22c, relatively dropped. The body frame at the same time will be tilted to some such angle as indicated by the plane 26a, at an angle of transverse tip not as large as that of the axle.

The relative up and down swings of the beams in their vertical longitudinal planes will be resiliently resisted and restored as previously explained. The transverse angular displacement of axle 20 with relation to the vehicle frame tends to carry mountings 19 to the same angular displacement, but that is resiliently resisted by the previously described rubber-block resistance to angular beam displacement about the longitudinal horizontal axis, D in FIG. 6. In consequence, rubber sleeves 98 are distortingly compressed, allowing angular movement of axle 20, in the vertical plane of FIG. 13, relative to mountings 19 and the two beams. Angular axle displacement such as indicated in FIG. 13 is thus resiliently allowed and opposed by both the action of the rubber blocks 84 and the action of rubber sleeves 98. In an actual construction the maximum axle tip with relation to the vehicle frame is usually about 5°; the beam tip taking about 3.5° of that, and the relative tip of 19 on the axle about 1.5°. The beams themselves take a part of the beam tip in elastic torsion.

In any such transverse axle tipping, with the two beams at different vertical angles, the two mountings 19 rotate relative to each other about the axle axis. The clearances at 116 (FIG. 5) allow that; and the shear action of rubber sleeves 98 also allow it and tend to restore the axle to its normal rotational position in mountings 19. In the structure, as it has been now described, the articulation of the axle or axles with the beams, involves limited freedom for relative universal angular movement between the axle and both beams. It will be obvious however that, as regards relative rotation of the axle on its own axis, the axle may be rotatively fixed to one beam and rotate only with relation to the other.

In the illustrative form of the device so far explained, it will be noted that the lateral surfaces of the central U-section 40 of the beam 22 form in effect single central lateral flanges associated with the beam seats 44 and lying between rubber blocks 84. In the modified form schematically shown in FIG. 14, the single central flanges 401, lying between the pairs of rubber blocks 841, associated with the suspension element seats 801, are carried by that element, indicated schematically at 241. The outer lateral flanges 821, associated with the beam seats 441, on beams 221, confine the pairs of rubber blocks 841 externally. The remainder of the structure of FIG. 14, including the wheel shafts 20 and their mountings 19, may be the same as above described.

The actions of this form under the various applied forces, are the same as before described; particularly as regards beam swinging about horizontal longitudinal and transverse axes. On swinging in a horizontal plane about a vertical central axis, as illustrated in FIG. 4, the action is in substance the same as in that figure. In the form shown in FIG. 4, on swinging in the direction indicated, for example, the rubber blocks 84a—the ones most closely adjacent the respective wheel axles 20—are compressed and exert the resilient restraint and restoring forces. Consequently the central portion of the beam between the blocks is not subjected to those forces. In FIG. 14, on swinging for example in the same direction, the blocks 841a, in the same positions relative to the axles, will be compressed, with the same results.

In the forms so far described it is remarked that upward (e.g.) movement of one axle 20 is yieldingly opposed by the described action of the rubber blocks 84 in the suspension. At a given angle of upward swing of one pair of beam ends with their associated axle, rubber block compression due to that swing supports a certain amount of load; and the suspension may be so designed (e.g. by increasing the block sizes in their areas bearing on the seats; or by increasing their radial distances from the horizontal transverse axis of swing) that the rubber blocks may take and support the whole load with only one wheeled axle articulated with one pair of beam ends.

It is, however, preferred in practice to also include in the device, some means, in addition to the rubber block or other suspension, to resist or counteract vertical movement of one axle. In the forms so far described, that function is performed, in the balanced structure, by the other wheeled axle articulated with the opposite pair of beam ends. But that function may be performed by a wheeled axle articulated in other manners, as for example indicated in the variant form of FIG. 15; or the load supporting force may be applied to the beams by other means, such as springs, as for example indicated in FIG. 16.

FIG. 15 schematically shows one beam 225 centrally suspended from vehicle frame 265 by a suspension element 245 that may be the same in structure and function as element 24 of FIGS. 1 to 13. An axle 205 may be articulated at one end in a mounting 195 (like 19 of those figures) at one end of beam 225. Another axle 206 is articulated in a similar mounting 196 at a medial point on another beam 226, universally pivoted at one end 227 to the other end of beam 225; and the other end of 226 may be suspended in another suspension element 246, again similar in structure and function to element 24. Axle 206 is thus articulated to beam 225 through beam 226. The illustrated structure, mounted at one side of the vehicle frame, is duplicated by a similar one in parallel relation at the other side of the frame; and axles 205 and 206 extend across and are also mounted on the beams of that second structure.

FIG. 16 schematically illustrates one side of another modification wherein 247 may be a suspension element under frame 266, similar in structure and function to suspension element 24, suspending a beam 228 in similar manner. Axle 207 is articulated in mounting 197, similar to mounting 19, at one end of that beam, and also in a similar mounting at the corresponding end of a duplicate beam similarly suspended in parallel relation at the opposite side of the vehicle frame. The other ends of the two beams 228 may have spring pressures applied to them. For instance, the pressure of a spring 301, mounted on the vehicle frame, may be applied in the direction indicated, through a link 302 to that other end of each beam. The articulation at 303 may be such as to allow the swinging and tilting of the beams as before described. Such a structure provides not only a single axle unit for a vehicle, but also an adapter by which axles may be added to existing running gear.

We claim:
1. A suspension for mounting, on a framed vehicle, a running gear of the type involving
   two substantially identic beam elements extending normally longitudinally and horizontally under the vehicle frame and located in transversely spaced mutual opposition,
   at least one wheel carrying axle extending transversely between and articulated to transversely opposed beam element ends,
   the axle articulation to each beam element end limiting relative movements of those ends axially of the axle, but allowing at least limited relative universal swinging movements between the axle and each beam element;
   said suspension comprising the combination, with each beam element,
   of a suspension element depending from the vehicle frame over a medial portion of the beam element and with its lower end portion located at the level of the medial portion of the beam element,
   one of said suspension and beam elements being bifurcated and straddling the other at opposite lateral sides of said other with clearances over the top of the beam element allowing relative swinging of that element in a vertical longitudinal plane and with lateral clearances allowing relative swinging of the beam element in a horizontal plane and also about a horizontal axis longitudinal of the beam element,
   and a load taking and swing opposing interconnection construction between said two elements, said construction comprising essentially identic structures at each of the laterally opposite sides of the straddled element and arranged in substantial symmetry about a vertical longitudinal plane substantially central of the beam element,
   each said structure at each lateral side of the straddled element comprising,
   seat members extending laterally from such lateral side of the straddled element and constituting a pair in longitudinally spaced V-formation in a vertical plane,
   seat members extending laterally on the straddling element and constituting a pair in longitudinally spaced V-formation in said vertical plane,
   said latter specified seat members severally spacedly opposing the several first specified seat members in said vertical plane,
   blocks of resilient material between the several opposing seat members of the two said elements,
   longitudinally projecting flanges on the lateral edges of the several seat members confining said blocks laterally,
   and said seat members and resilient blocks extending below a normaly horizontal plane through the axle articulation.

2. The suspension defined in claim 1 and in which a lateral side of the straddled element forms two of said longitudinally projecting flanges.

3. The suspension defined in claim 1 and in which said straddled element is the beam element.

4. The suspension defined in claim 3 and in which a lateral side of the beam element forms two of said longitudinally projecting flanges.

5. The suspension defined in claim 1 and in which said seat members and resilient blocks extend both above and below said normally horizontal plane with their said upper and lower extents centered substantially at said normally horizontal plane.

6. The suspension defined in claim 1 and in which a second wheel carrying axle extends transversely between and is articulated to the other transversely opposed beam element ends in normal parallelism with the said one axle and articulated to said other beam ends in the same manner as is the said one axle,
   in which the said seat members and resilient blocks extend below a normally horizontal plane through both axles,
   and in which the said seat members and resilient blocks are spacedly arranged fore and aft in substantial symmetry about a vertical transverse plane central of the length of the beam element between the axles.

7. The suspension defined in claim 6 and in which said seat members and resilient blocks extend both above and below said normally horizontal plane with their said upper and lower extents centered substantially at said normally horizontal plane.

References Cited in the file of this patent

UNITED STATES PATENTS

| | | |
|---|---|---|
| 2,211,463 | Hobson | Aug. 13, 1940 |
| 2,237,575 | Quartullo | Apr. 8, 1941 |
| 2,360,619 | Peterman | Oct. 17, 1944 |
| 2,788,250 | Blattner | Apr. 9, 1957 |
| 2,798,735 | Compton | July 9, 1957 |
| 2,814,501 | Clark | Nov. 26, 1957 |
| 2,907,579 | Masser | Oct. 6, 1959 |
| 2,995,383 | Barker | Aug. 8, 1961 |

FOREIGN PATENTS

| | | |
|---|---|---|
| 872,008 | Germany | Mar. 26, 1953 |
| 337,332 | Italy | Mar. 2, 1936 |